United States Patent [19]

Aspin et al.

[11] 3,775,222
[45] Nov. 27, 1973

[54] HEAT SEALING APPARATUS

[75] Inventors: Peter Aspin, Chelmsford; Roy Garwood, Leigh-on-Sea; Peter Wise, Basildon, all of England

[73] Assignee: Pembroke Carton and Printing Company Limited, Essex, England

[22] Filed: Apr. 12, 1971

[21] Appl. No.: 133,176

[30] Foreign Application Priority Data
Apr. 14, 1970  Great Britain................... 17,655/70

[52] U.S. Cl................ 156/497, 156/203, 156/359, 156/466
[51] Int. Cl............................................ B29d 23/00
[58] Field of Search.................. 156/203, 359, 459, 156/466, 497, 499; 53/28, 175, 177; 93/77, 93/82; 34/46, 47, 48, 49, 51, 52; 237/9, 10, 237/11; 263/19 A; 165/35

[56] References Cited
UNITED STATES PATENTS
2,753,846  4/1939  Russell et al...................... 34/46 X
2,587,422  2/1952  Wills................................... 156/497
3,380,229  4/1968  Nelson........................... 156/497 X FOREIGN PATENTS OR APPLICATIONS
1,238,373  7/1971  Great Britain..................... 156/497

Primary Examiner—Alfred L. Leavitt
Assistant Examiner—Caleb Weston
Attorney—Flynn & Frishauf

[57] ABSTRACT

Air is heated and fed to a nozzle for hot air sealing a longitudinal seam in a web of material to continuously form a tube e.g. of different kinds of lining material in a carton lining machine required to be heated to different levels in order to form the seal. The air is fed at a regulated pressure, in parallel, through a heater block and a number of valve controlled passages bypassing the heater. The heat input to the heater and the amount of the air bypassing the heater are both controlled to give a required temperature level of the seam, regardless of the speed of formation of the tube.

16 Claims, 3 Drawing Figures

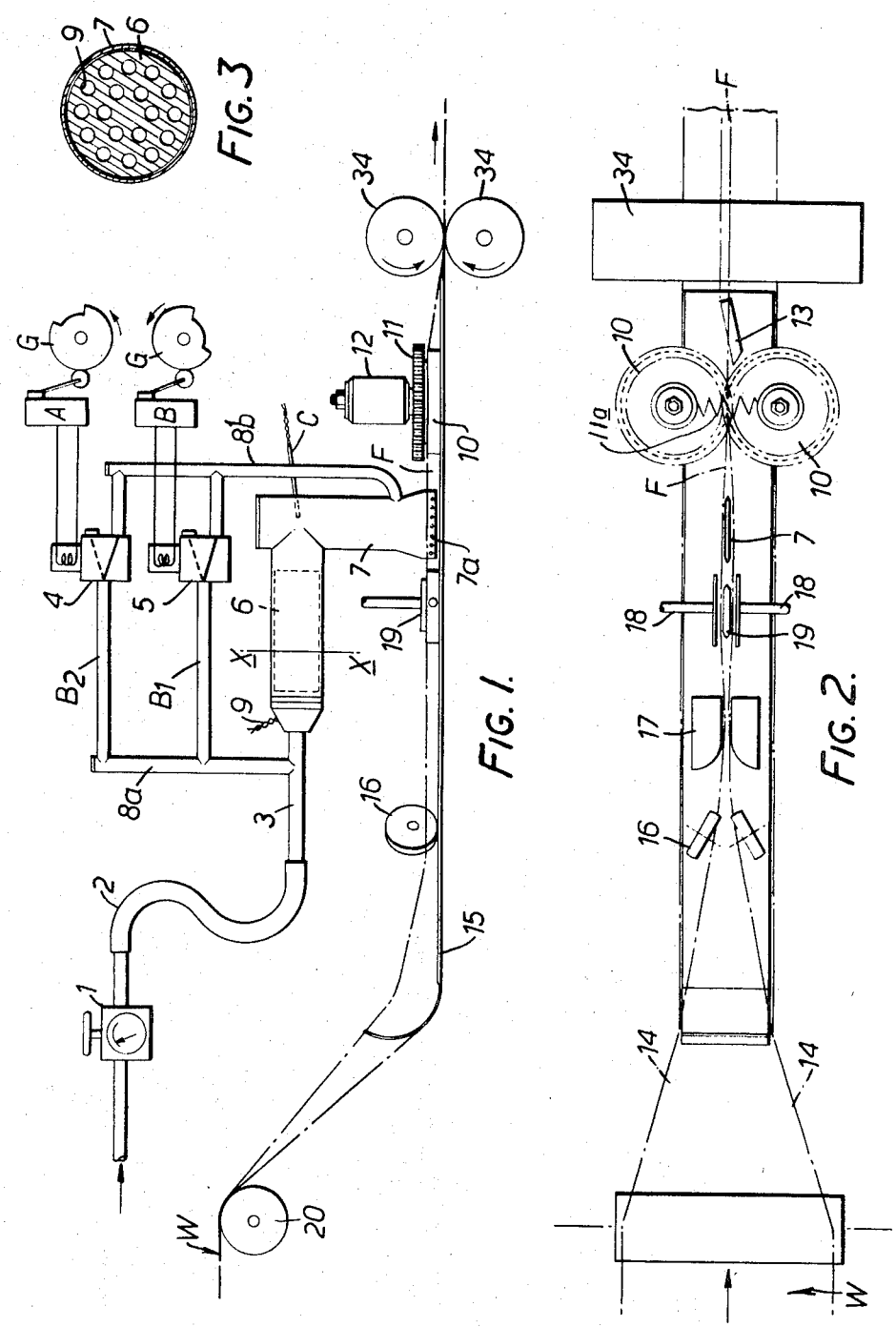

HEAT SEALING APPARATUS

This invention relates to heat sealing and concerns a method of, and apparatus for, heating gas being supplied to a nozzle or the like in a heat sealing process to a readily variable, controlled temperature.

In carton lining machines a web of lining material may be continuously formed into a tube from which carton liners are cut in the machine. Such machines are described in British Patent Nos. 733,144 and 959,821 for example. The tube is formed with a longitudinal seam. One way of forming the seam is to use a web coated with a layer of material which becomes tacky when heated and to heat the seam with hot gas from a nozzle or the like introduced into the seam, and thereafter subject the seam to pressure.

From one aspect, this invention provides a method of heating gas being supplied to a nozzle or the like in a heat sealing process to a readily variable, controlled temperature, comprising passing the gas at a regulated pressure, in parallel, through a heater and through one or more heater bypasses and controlling the heat input of the heater and the proportion of the gas bypassing the heater.

In this way, the temperature of the gas at the nozzle may be rapidly altered without altering the pressure of the gas at the nozzle.

According to a feature of this invention, in the application of the above defined method of this invention to the heat sealing of a longitudinal seam of a continuously formed tube at a fixed heat sealing station, the proportion of gas bypassing the heater is controlled in accordance with the speed of formation of the tube whereby the seam is heated to a required level regardless of its speed of travel through the heat sealing station.

The invention further provides heat sealing apparatus comprising a gas nozzle and means for supplying hot gas to the nozzle including a heater, one or more heater bypasses in parallel with the heater, valve means for controlling the flow of gas through each of the bypasses and means for controlling the heat input of the heater in response to the temperature of gas leaving the heater to maintain the temperature constant.

According to a further feature of this invention apparatus for continuously forming a tube includes a heat sealing apparatus according to the invention as above defined wherein the nozzle is located at a fixed heat sealing station for sealing a longitudinal seam of the tube and means is provided for controlling said valve means in response to the speed of formation of the tube whereby the seam is heated to a required level regardless of its speed of travel through the heat sealing station.

A specific apparatus according to this invention for performing a method according to the invention will now be described by way of example with reference to the accompanying drawings, in which:

FIG. 1 is an elevation of the apparatus,
FIG. 2 is a plan of the apparatus, and
FIG. 3 is a section on line X—X in FIG. 1.

Referring to the drawings, the apparatus forms part of a lining machine as described in British Patent No. 959,821.

A web W of lining material is fed from a feed roll (not shown) to a rotary cutter (not shown) by means, including a pair of draw rolls 34.

The web W may be polythene or polythene laminated to paper, paper and metal foil or to thermoplastic plastics material of higher melting temperature than polythene.

The apparatus converts the flat web W into a continuous flat tube by guiding the web in such a manner that longitudinal edge portions 14 of the web are brought into close proximity to form, at F, a fin seal seam as the web is drawn forward by the rolls 34, into which a blast of hot air is introduced at a fixed station in the apparatus for a nozzle 7. The hot air melts the polythene so that the adjacent surfaces of the portions 14 become tacky, whereafter the surfaces are sealed together by passage of the fin seal F through the nip of a pair of rollers 10 thereby permanently to form the seam.

The web is drawn by the rolls 34 over an idler roller 20 and along a horizontal forming plate 15. Rollers 16 and guides 17 form the web into a flat tube against the plate 15 with the portions 14 vertical and held open by a predetermined amount by guides 18 and 19. The nozzle 7 has a flattened end 7a positioned in the open fin seal F and hot air is directed against the adjacent surfaces of the portions 14 through a multiplicity of holes in the flattened end 7a of the nozzle. The rollers 10 are geared together by gears 11 and loaded against each other by a spring 11a. The fin seal is drawn through the nip of the rollers 10 by the draw rolls 34 and the rollers 10 are thus caused to rotate and press together the longitudinal edge portions 14 to make the seam and at the same time to cool the seam prior to the fin seal being folded flat by a guide 13.

Compressed air at a controlled pressure is admitted through a regulator 1 and a flexible pipe 2 into a pipe 3 and flows from the pipe 3 into the nozzle 7, in part through a multi-cored ceramic heater block 6 (see also FIG. 3). The cored holes in the block contain electric heater elements 9. Means is provided to adjust the electric current supply to the heater elements 9 in response to signals derived from a thermo-couple C exposed to the hot air leaving the heater block 6 to maintain the hot air leaving the heater block 6 at a predetermined constant temperature. Any proprietary electronic temperature control apparatus may be used for this purpose, for example that marketed by Ether Ltd.

In order to enable rapid changes in temperature to be made in the air at the exit holes in the flattened end 7a of the nozzle, without altering the air pressure inside the nozzle, bypass passages $B_1$ and $B_2$ are provided around the heater block 6 from a pipe 8a communicating with the pipe 3 to a pipe 8b opening into the nozzle near its flattened end 7a. The bypasses $B_1, B_2$ are controlled by valves 4 and 5 respectively having open and closed positions.

Cold compressed air from pipe 3 may be allowed to bypass the heater block through valve 4 or 5 or both of the valves 4 and 5 to rejoin, and mix with, the hot air immediately before the nozzle exit holes.

The valves 4 and 5 are arranged to be electrically operated by solenoids which are in turn operated by microswitches A and B under the control of cams G on a control shaft arranged to be rotated by a single electric pilot motor to rotate the field coils and thereby adjust the speed of the main drive motor to the machine and therefore the draw rolls 34.

The cams G are rotated in the direction indicated by the arrows as the control shaft is rotated to speed up the main drive and therefore the draw rolls 34. As shown in FIG. 1 the valves 4 and 5 are set in an open position, corresponding with a closed or operated position of the microswitches A and B. When the machine is stationary switches A and B are open. When the speed of the machine has been increased beyond a first predetermined speed switch A is closed and when the speed of the machine has been increased beyond a second and higher predetermined speed switch B is also closed. The arrangement is such as to tend to maintain the temperature to which the adjacent surfaces of the fin seal are heated to a required level regardless of the speed of rotation of the draw rolls 34 and therefore, the speed of operation of the machine.

The nozzle 7 together with the heater block and piping 3, 8a $B_1$, $B_2$, and 8b is bodily movable to insert the flattened end of the nozzle between the longitudinal edge portions 14 at the commencement of a heat sealing operation.

Alternatively the by-pass valves may be fixedly mounted and interconnected between the piping 3 and the nozzle 7 by flexible piping, the nozzle 7 and the heater block 6 only being mounted for bodily movement for example on a parallelogram linkage arranged to be operated by a pneumatic piston and cylinder assemblage.

The guide 19 holds the portions 14 apart when the machine is at rest or running with the nozzle 7 raised, and allows the nozzle 7 to be entered freely between them when it is desired to start sealing. It also holds the web away from the nozzle so that the heated surfaces of the web are not dragged across the holes in the nozzle and the melted material of the web allowed to clog the holes.

The temperature of the air leaving the nozzle may be required to be raised to between 200°C and 600°C depending upon the speed of formation of the tube and the material being heat sealed.

The number of valve controlled bypass passages $B_1$, $B_2$ may be increased as required to maintain the temperature to which the adjacent surfaces of the fin seal are heated within prescribed limits regardless of the machine speed.

In a modification, the valves 4 and 5 may be of different size so that valve 5 passes more air when open than valve 4. In this case, the valves may be operated so that the valve 4 just opens, then valve 5 opens and valve 4 closes and then valve 4 re-opens so that both valves 4 and 5 are open together. In this way, the amount of by-pass air is increased in three stages using only two by-pass passages. The sequence of operation of the valves 4 and 5 as just described may be achieved by suitable design of the cam G controlling the valve 4.

A similar sequence of operation of valves controlling the passage of air through more than two by-passes may be adopted. In the case of three by-passes for example the amount of by-pass air is increased in seven stages.

We claim:

1. Apparatus for continuously forming a tube including heat sealing apparatus comprising a gas nozzle and means for supplying hot gas to the nozzle including a heater, at least one heater bypass in parallel with the heater, valve means for controlling the flow of gas through each of the bypasses and means for controlling the heat input of the heater in response to the temperature of gas leaving the heater to maintain the temperature substantially constant, said nozzle being located at a fixed heat sealing station for sealing a longitudinal seam of the tube and means being provided for controlling said valve means in response to the speed of formation of the tube whereby the seam is heated to a required level regardless of its speed of travel through the heat sealing station.

2. Apparatus as claimed in claim 1 including a pair of draw rolls for drawing forward a web to form the tube and said means for controlling said valve means electrically operates said valve means in response to the speed of rotation of the draw rolls.

3. Apparatus as claimed in claim 2 further including means for guiding a web drawn forward by the draw rolls into a tube with longitudinal edge portions of the web in close proximity at said fixed heat sealing station, said nozzle being arranged to introduce a blast of hot air between said longitudinal edge portions so that the adjacent surfaces of said longitudinal edge portions become tacky and a pair of nip rollers for sealing the tacky adjacent surfaces of said longitudinal edge portions together to thereby permanently to form the seam.

4. Apparatus as claimed in claim 3 wherein said nip rollers are geared together and resiliently loaded against each other, and the seam is drawn through the nip of said nip rollers by said draw rolls.

5. Apparatus as claimed in claim 3 wherein said guiding means comprises an idler roller, a forming plate and rollers and guides for forming the web into a flat tube against the forming plate with said longitudinal edge portions disposed perpendicular to the forming plate and held apart by further guides for the introduction between them of the hot air blast from said nozzle.

6. Apparatus as claimed in claim 5 wherein the nozzle has a flattened end arranged to be positioned between said longitudinal edge portions of the web and holes formed in the flattened end, hot air being directed against the adjacent surfaces of said longitudinal edge portions through the holes in the flattened end of the nozzle.

7. Apparatus as claimed in claim 6 wherein the nozzle is movable towards and away from said longitudinal edge portions to enable its flattened end to be inserted between them at the commencement of a heat sealing operation.

8. Apparatus according to claim 1 comprising a plurality of bypasses, each passing a different amount of gas, connected in parallel with the heater.

9. Apparatus according to claim 8 wherein said means for controlling said valve means for controlling the flow of gas through selected ones of said bypasses as a function of the speed of formation of the tube.

10. Apparatus as claimed in claim 1 wherein the heater is in the form of a multi-cored ceramic heater block the cored holes in which contain electric heater elements, and means is provided to adjust the electric current supply to the electric heater elements in response to signals derived from a temperature sensing element exposed to the hot air leaving the heater block.

11. Apparatus as claimed in claim 1 wherein each of said valve means has open and closed positions to open and close the respective bypasses and the valve means all pass different amounts of air when open.

12. Apparatus according to claim 1 wherein said longitudinal seam is arranged so as to form a "fin seal."

13. A method of heating sealing a longitudinal seam of a continuously formed tube at a fixed heat sealing station using hot gas comprising passing the gas, at a regulated pressure, through a heater; selectively bypassing predetermined quantities of said gas around said heater through at least one bypass; directing the output gas from the heater and from said at least one bypass onto selected portions of said tube; controlling the heat input of the heater as a function of the temperature of the gas leaving the heater; controlling said at least one bypass to control the proportion of gas bypassing the heater as a function of the speed of formation of the tube, whereby the seam is heated to a required level regardless of its speed of travel through the heat sealing station.

14. A method according to claim 13 wherein said at least one bypass is connected in parallel with said heater.

15. A method according to claim 13 comprising a plurality of bypasses, each bypass passing different amounts of gas, and selectively bypassing predetermined quantities of said gas through selected ones of said bypasses as a function of said speed of formation of the tube.

16. The method according to claim 13 wherein said longitudinal seam is arranged so as to form a "fin seal."

* * * * *